United States Patent [19]

Archambeault et al.

[11] Patent Number: 4,641,358

[45] Date of Patent: Feb. 3, 1987

[54] OPTICAL MARK READER

[75] Inventors: Bruce R. Archambeault, Nashua, N.H.; David P. Rancour, W. Lafayette, Ind.

[73] Assignee: The United State of America as represented by the Secretary of the Air Force, Washington, D.C.

[21] Appl. No.: 662,476

[22] Filed: Oct. 18, 1984

[51] Int. Cl.⁴ .............................................. G06K 9/20
[52] U.S. Cl. ..................................... 382/68; 235/456
[58] Field of Search ................... 382/68; 235/456, 460

[56] References Cited

U.S. PATENT DOCUMENTS

| | | | |
|---|---|---|---|
| 3,315,377 | 4/1967 | Stillwell | 35/48 |
| 3,413,603 | 11/1968 | Kimura et al. | 382/68 |
| 3,506,837 | 4/1970 | Majima | 382/68 |
| 3,549,895 | 12/1970 | Sidorsky | 235/460 |
| 3,761,688 | 9/1973 | Cassel | 235/61.11 E |
| 3,970,990 | 7/1976 | Carson | 340/146.3 F |
| 3,983,364 | 9/1976 | Firehammer | 235/61.6 E |
| 4,217,487 | 8/1980 | Kjeer | 235/468 |

Primary Examiner—Anthony V. Ciarlante
Attorney, Agent, or Firm—William G. Auton; Donald J. Singer; Willard R. Matthews

[57] ABSTRACT

The reading of the presence or absence of a pencil or similar mark at various locations on a sheet of paper is accomplished by an optical Mark-Reader comprised of a completely solid state sensing mechanism with no moving parts. The Optical Mark Reader (OMR) contains a matrix of light sensitive transistors with their geometry and logic circuits capable of being tailored for a plurality of answer sheets. The internal logic circuits enable certain sections of the page to be read, generate a delay time while the data is being gathered, tell the host computer when the data is complete, and resets the OMR operator control system for successive page readings. Finally, the internal logic circuits and output bus of the OMR takes the "raw" data from the answer sheets and presents information on an output bus in a format allowing any computer (even a micro-computer) to be the host computer.

4 Claims, 9 Drawing Figures

OPTICAL MARK READER

STATEMENT OF GOVERNMENT INTEREST

The invention described herein may be manufactured and used by or for the Government for governmental purposes without the payment of any royalty thereon.

BACKGROUND OF THE INVENTION

This invention relates to the photoelectric scanning or reading of documents and in particular to an optical mark reader which reads the presence or absence of a pencil or similar mark at various locations on a sheet of paper.

It is common in elementary examinations and even in some more advanced examinations to give multiple choice questions. These are questions where the student is required to select the most appropriate answer of a number offered in the paper. The marking of such papers can be tedious and lengthy since there may be a number of "scoring" selections and no single unique answer.

The task has been alleviated to some degree by prior art techniques and devices that provide automatic reading of answer sheets. The extent of these prior art devices is given by the following patents: U.S. Pat. No. 3,953,364 issued on Sept. 29, 1976 to Firehammer et al, U.S. Pat. No. 3,761,688 issued on Sept. 25, 1073 to Cassel, U.S. Pat. No. 3,315,377 issued on April 25, 1967 to Stillwell, and U.S. Pat. No. 4,217,487 issued on Aug. 12, 1980 to Kjeer.

The Firehammer et al patent discloses a device for reading an examination answer sheet in which certain areas have been darkened by a lead pencil. Photoelectric cells provide analog voltages having magnitudes in accordance with the opacity of the marks on the sheet. The information is digitized and forwarded to a computer for processing. However, the Firehammer et al device uses a motor and drive roller to move the examination sheet past a photoelectric pickup station to read it, thereby adding to cost and complexity and making it subject to mechanical wear.

The Cassel patent discloses a high-speed optical card reader in which all the holes are read simultaneously. The reader in this device includes an input hopper for storing cards to be read, the reading means, and a transport means. The transport means includes a picker blade which is mounted for reciprocating movement parallel to the table and is conventionally driven by a crank and by levers. Therefore, the Cassel invention has been found to be deficient in two ways. First, it requires moving parts to function. Second, the Cassel invention reads "holes" by giving a positive output for a column element that is illuminated in comparison to remainder column element of the rows which are darkened. The Optical Mark Reader has no moving parts in its sensing mechanism and distinguishes a column element in that it is darkened in comparison to the remainder column elements in the rows, which are illuminated.

The Stillwell et al device is directed to a computer for "scoring" the answer sheet of a student's examination paper which senses marks on the paper using photocells. This device also requires moving parts to function. The paper is read by moving it under the sensing heads of the reading machine.

Kjeer shows a document scanner for determining the light transmissivity of the document using phototransistors. Like other prior art devices, the Kjeer document scanner uses moving parts to function.

The Optical Mark Reader (OMR) resembles a number of prior art devices in the fact that it will automatically read the presence or absence of a mark located at various locations on a sheet of paper. However, this invention is completely solid-state, with no moving parts. This greatly reduces mechaincal wear and alignment problems which account for the majority of breakdowns of currently available OMRS.

None of the references disclose a rapid digital output light transmissivity reader having no moving parts. All known prior art devices are subject to the problem of frequent breakdowns due to mechanical wearing of parts and mis-alignment of moving carriages.

Additionally, the reliability and availability of the prior art devices are further limited to the mean time between failure of the individual photocells in the sensing mechanism.

Finally, the prior art devices each require a special computer to interface with in order to convert the "raw" data into useable information.

In view of the foregoing discussion, it is apparent that there currently exists the need for a device capable of reading the presence cr absence of a mark on a sheet of paper where such device has no moving parts in its sensing mechanism; the device has multiple sensing elements in each cell of its sensing mechanism so that when one element disfunctions, accurate readings are still taken; and such device has its own internal logic circuits for processing the "raw" data such that any computer (even a micro-computer) may be the host computer.

The present invention is directed towards satisfying that need.

SUMMARY OF THE INVENTION

This invention provides a means for detecting and locating discrete opaque regions on one surface of a translucent sheet by illuminating the surface of the sheet with electromagnetic wave energy, then sensing the energy with a matrix of electromagnetic wave energy sensor elements which are fixed in proximate relationship to the distal surface and associated with a discrete region of the sheet. For the purpose of the invention, the term "transluscent" and "opaque" are to be construed in their broadest sense as being capable of allowing and rejecting respectively, the passage of any electromagnetic wave energy. The individual sensor elements in the matrix generate distinct and separate outputs responsive to transluscent and opaque conditions in the sheet which is read.

One presently preferred embodiment of the invention provides a means of reading the presence or absence of a pencil or similar mark at various locations on a sheet of paper such that the sensing mechanism has no moving parts. Furthermore, the sensing mechanism contains a "voting system" of multiple sensing elements connected to a voting logic circuit such that when a single element disfunctions, accurate readings may still be taken. Finally, the invention possesses its own internal logic circuits which processes the data produced by the sensing mechanism.

In order to read the presence or absence of marks at various locations on a sheet of paper, the OMR uses a matrix of light-sensitive transistors as the sensing elements. The result is a completely solid-state sensing mechanism with no moving parts.

In order to avoid the necessity of repairing the OMR each time a single sensing element disfunctions, the OMR sensing mechanism contains a "voting system". In one embodiment, three light-sensitive transistors are contained in each sensing element, along with three interconnected nand gates such that as long as two transistors indicate the presence (or absence) of a mark, that result will be transmitted by the sensing element.

In order to allow any computer (even a micro-computer) to act as the host computer for the OMR, the OMR possesses its own internal logic circuit which processes the data produced by the sensing mechanism into computer compatible information, which is available and useable to any computer via an output bus. Briefly, these circuits consist of:

a Master Logic Control Circuit, controlling which section of the page is to be read, the page number;

The Delay and Output Logic Circuit, producing the delay while each page is read (approximately one second) and communicating the sensing mechanism results to an output bus;

a Word Mark Logic Circuit, detecting the presence or absence of a mark in the word list column;

a Control Address Logic Circuit, causing the correct word mark logic circuit to be enabled in its turn;

a Page Number Logic Circuit, identifying a page number for each successive page read; and an Internal Test Circuit isolating faults in the OMR.

It is a principal object of the invention to provide a new and improved means of reading the presence or absence of marks on various locations of a sheet of paper with reduced mechanical wear and alignment problems and increased reliability and availability.

It is another object of the invention to provide a means of reading the presence or absence of marks on a sheet of paper when the sensing mechanism of such means is completely solid state, with no moving parts.

It is another object of the invention to provide a device which not only senses the presence or absence of a mark at various locations on a sheet of paper, but also processes the new data into useful information such that any computer (even a micro-computer) may be the host computer.

These, together with other objects, features and advantages of the invention will become more readily apparent from the following detailed description when taken in conjunction with the accompanying drawing wherein like elements are given like reference numerals throughout.

DETAILED DESCRIPTION OF THE PREFERRED EMBODIMENT

This invention is an optical mark reader that provides a means of reading the presence or absence of a pencil or similar mark at various locations of a sheet of paper. In order to reduce the mechanical wear and alignment problems which account for the majority of breakdown in currently available devices, the sensing mechanism of the Optical Mark Reader (OMR) is completely solid-state with no moving parts.

In the particular embodiment herein often described, the OMR is designed to read the answer sheet of the U.S. Air Force Diagnostic Rhyme Test (DRT) which answer sheet is identified or U.S.A.F. form GPO 519-614. The following test sheets format is a facimile of that form.

| DIAGNOSTIC RHYME TEST | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| | | | | | | | | | | | | | LISTENER 0 | | | | | | | | | | | | | | | | |
| | | | | | | | | | | | | 0 | 1 | 2 | 3 | 4 | 5 | 6 | 7 | 8 | 9 | | | | | | | | |
| | | | | | | | | | | | | 0 | 1 | 2 | 3 | 4 | 5 | 6 | 7 | 8 | 9 | | | | | | | | |
| | | | | | | | | | | | | 0 | 1 | 2 | 3 | 4 | 5 | 6 | 7 | 8 | 9 | | | | | | | | |
| | | | | | | | | | | | | 0 | 1 | 2 | 3 | 4 | 5 | 6 | 7 | 8 | 9 | | | | | | | | |
| SPEAKER | | | | | | | | | | | | | | | | | | | | | | | | | | | | | |
| A | B | C | D | E | F | G | H | I | J | K | L | M | N | O | P | Q | R | S | T | U | V | W | X | Y | Z | | | | |
| A | B | C | D | E | F | G | H | I | J | K | L | M | N | O | P | Q | R | S | T | U | V | W | X | Y | Z | | | | |
| 0 | | | | | GOB - BOB | | | | | | | | | | | COOT - TOOT | | | | | | | | | | 0 | | | |
| 0 | | | | | DAUNT - TAUNT | | | | | | | | | | | BOND - POND | | | | | | | | | | 0 | | | |
| 0 | | | | | MOOT - BOOT | | | | | | | | | | | MOAN - BONE | | | | | | | | | | 0 | | | |
| 0 | | | | | SHEET - CHEAT | | | | | | | | | | | VILL - BILL | | | | | | | | | | 0 | | | |
| 0 | | | | | JAB - GAB | | | | | | | | | | | JEST - GUEST | | | | | | | | | | 0 | | | |
| 0 | | | | | POT - ROT | | | | | | | | | | | FOUGHT - THOUGHT | | | | | | | | | | 0 | | | |
| 0 | | | | | GHOST - ROAST | | | | | | | | | | | COOP - POOP | | | | | | | | | | 0 | | | |
| 0 | | | | | RILL - NILL | | | | | | | | | | | NEAP - REAP | | | | | | | | | | 0 | | | |
| 0 | | | | | ZED - SAID | | | | | | | | | | | VAST - FAST | | | | | | | | | | 0 | | | |
| 0 | | | | | GNAW - DAW | | | | | | | | | | | KNOCK - DOCK | | | | | | | | | | 0 | | | |
| 0 | | | | | SHOES - CHOOSE | | | | | | | | | | | THOSE - DOZE | | | | | | | | | | 0 | | | |
| 0 | | | | | CHEEP - KEEP | | | | | | | | | | | SING - THING | | | | | | | | | | 0 | | | |
| 0 | | | | | BANK - DANK | | | | | | | | | | | MET - NET | | | | | | | | | | 0 | | | |
| 0 | | | | | GOT - DOT | | | | | | | | | | | CAUGHT - TAUGHT | | | | | | | | | | 0 | | | |
| 0 | | | | | NOSE - ROSE | | | | | | | | | | | NUDE - RUDE | | | | | | | | | | 0 | | | |
| 0 | | | | | DINT - TINT | | | | | | | | | | | BEAN - PEEN | | | | | | | | | | 0 | | | |
| 0 | | | | | NECK - DECK | | | | | | | | | | | MAD - BAD | | | | | | | | | | 0 | | | |
| 0 | | | | | THONG - TONB | | | | | | | | | | | VOX - BOX | | | | | | | | | | 0 | | | |

-continued

| | DIAGNOSTIC RHYME TEST | | |
|---|---|---|---|
| 0 | CHOO - COO | JOE - GO | 0 |
| 0 | WEED - REED | BID - DID | 0 |
| 0 | SHAG - SAG | YEN - WREN | 0 |
| 0 | KNOB - ROB | WROUGHT - NOUGHT | 0 |
| 0 | VOLE - FOAL | ZOO - SUE | 0 |
| 0 | NIP - DIP | NEED - DEED | 0 |
| 0 | FENCE - PENCE | THAN - DAN | 0 |
| 0 | SAW - THAW | CHOP - COP | 0 |
| 0 | POOL - TOOL | FORE - THOR | 0 |
| 0 | YIELD - WIELD | HIT - FIT | 0 |
| 0 | GNAT - RAT | NEST - REST | 0 |

Since the arrangement and the numbers of choices in the sheet are associated with the geometry of the OMR sensors and the logic gates behind those sensors. While the particular embodiment described below is tailored towards an evaluation of this particular answer sheet, it is understood that the words which are used are of description and not limitation. A simple change in the geometry of the elements described below would allow the invention to be used for different purposes and answer sheets.

The DRT is used to evaluate digital voice communication systems. This evaluation is done by providing an answer sheet with pairs of similar sounding words, then speaking one of the words over the digital voice system and having the listener select which word was spoken. Therefore, the DRT sheet has 58 word pairs (29 on the left side and 29 on the right). Each letter is instructed to mark out the word he hears. If the listener decides he made a mistake in marking a word, then he marks the "correction" box next to the word pair rather than erase his choice and re-marking it.

The OMR will read the choice made in each of the 58 word pairs as well as read the corrected choice if the "correction" box next to a word pair is marked.

In the DRT answer sheet, there is a block marked "Listener" containing 4 rows of 10 choices in which the test-taker identifies himself according to the instructions he receives. The OMR will read the selection made in each of these rows.

The final item in the DRT answer sheet that is read by the OMR is the page number. In the top right hand corner of the answer sheet there is a darkened space. When multiple sheets of the DRT are used, the darkened space is moved a measured distance to the right. By reading the position of the darkened space, the OMR reads a page number.

As mentioned above, in order to reduce the mechanical wear and alignment problems, which account for the majority of breakdowns in currently available devices, the sensory mechanism of the Optical Mark Reader (OMR) is completely solid-state, with no moving parts. The sensing mechanism consists of a matrix of photosensitive transistors which are fixed in a plate upon which a sheet of paper may be placed, and a means of illumination above the plate which shines down on the paper. Each light sensitive transistor senses the amount of light being transmitted through a sheet of paper. The amount of light will vary, depending upon whether or not a mark is on the area of paper covering a particular set of light sensitive transistors.

Figure 1:
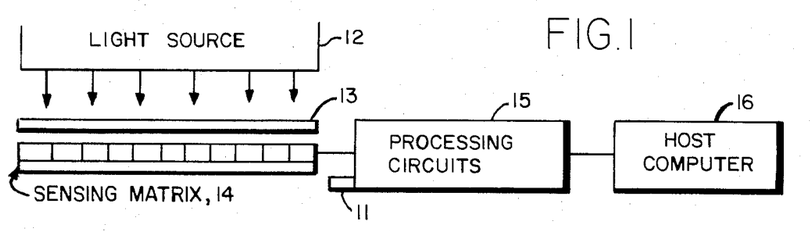
FIG. 1 schematically illustrates the major components of the invention.

FIG. 1 is a block diagram of the OMR which has been designed to read the DRT answer sheet. When the OMR signal processing circuits and system master clock are activated by the reset button 11, a light source 12 shines down on the DRT answer sheet 13 which has been placed on the matrix of light sensitive transistors 14.

In this particular embodiment, the "light source" 12 in the sensing mechanism consists of six forty watt light bulbs which are constantly illuminated while the OMR is on. These light bulbs are suspended in a frame of approximately $8\frac{1}{2}'' \times 11''$ in area over a plate of transistors covering an equal area. The light sensitive transistors in the sensing mechanism are electrically connected to a set of processing circuits (15) which interfaces with the host computer (16).

Figure 2:
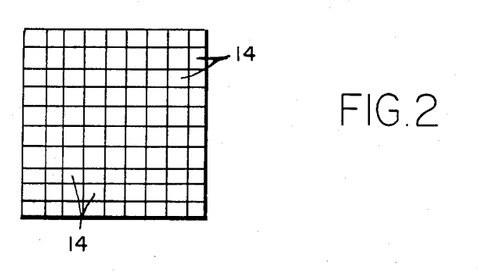
FIG. 2 is a top view of the sensing matrix of FIG. 1.

FIG. 2 is a sectional view of the sensing matrix of FIG. 1 taken at the top viewpoint. The matrix can cosist of full rows and column of light sensitive transistors elements 14 as shown for an OMR with universal reading capabilities, or it can consist of a particular geometric arrangement of elements that are in register with the answer blocks of a particular test sheet. The geometrical arrangement of the transistors in the present example is determined from the intended use of the device and corresponds to the DRT answer sheet referenced above.

In this embodiment, the sensing matrix is designed to read three types of data. The page number of the DRT answer sheet is read by a row of four transistors in the upper right hand corner. The page number of the DRT answer sheet is limited by a preprinted darkened space placed in one of 4 positions corresponding to the positions of one of these four transistors.

The instructions accompanying the DRT answer sheet direct the examiner to identify a listener number which is read by the transistors in register with the block of numbers identified as "LISTENER" in the above Diagnostic Rhyme Test facimili.

Finally, the sensing matrix reads the selection of the 58 word pairs in the four columns of words with the correction block being read by columns of transistors in register with two outer colums of 0's.

Figure 3:
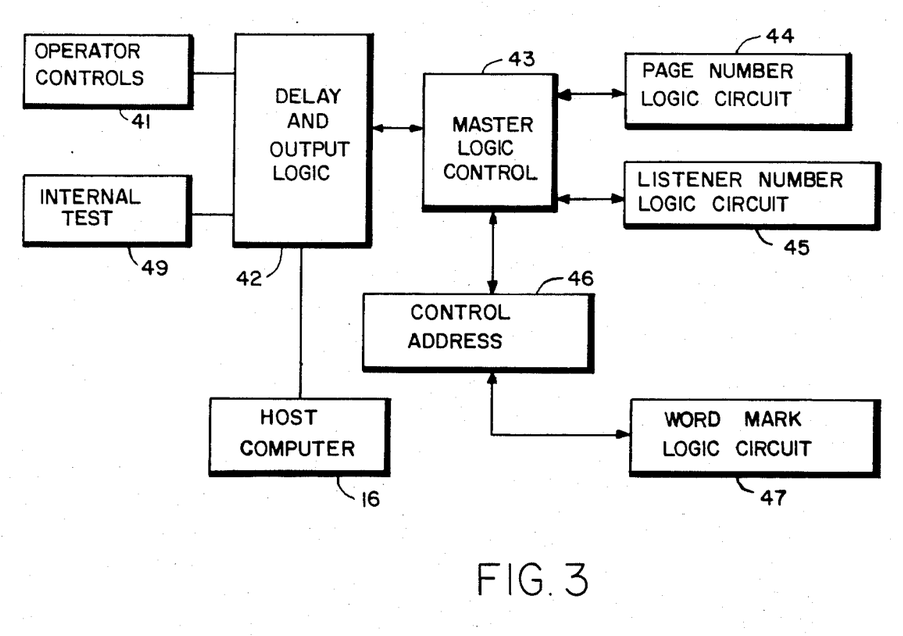
FIG. 3 is a block diagram of the data processing circuits.

FIG. 3 is a block diagram of the data processing circuits. In this particular embodiment, the operator indicates each reading by pressing the reset button in the Operator Manual Control (41), and producing a read command signal.

The read command signal is received by the Delay and Output Logic Circuit 42 which does three things at that moment: it informs the host computer (16) that data is being taken, it produces the delay of 0.8192 seconds while data is being read, and sends an enable command to the Master Logic Control Circuit (43).

The Master Logic Control Circuit (43) sends an enable comxand to the Page Number Logic Circuit (44), Listener Number Logic Circuit (45) and the Control Address Logic Circuit (46).

The Page Number Logic Circuit (43) is connected to the set of sensors reading the page number (23 a FIG. 2).

The Listener Number Logic Circuit is connected to the set of sensors reading the listener number on the DRT answer sheet.

Finally, the Control Address Logic Circuit (46) causes the correct Word Mark Logic Circuit (47) to be enabled. All the sensors when enabled, read the DRT answer sheet and send the results back to the Delay and Output Logic Circuit (42) via their associated logic circuits. The function of these logic circuits is described in detail below.

Figure 4:
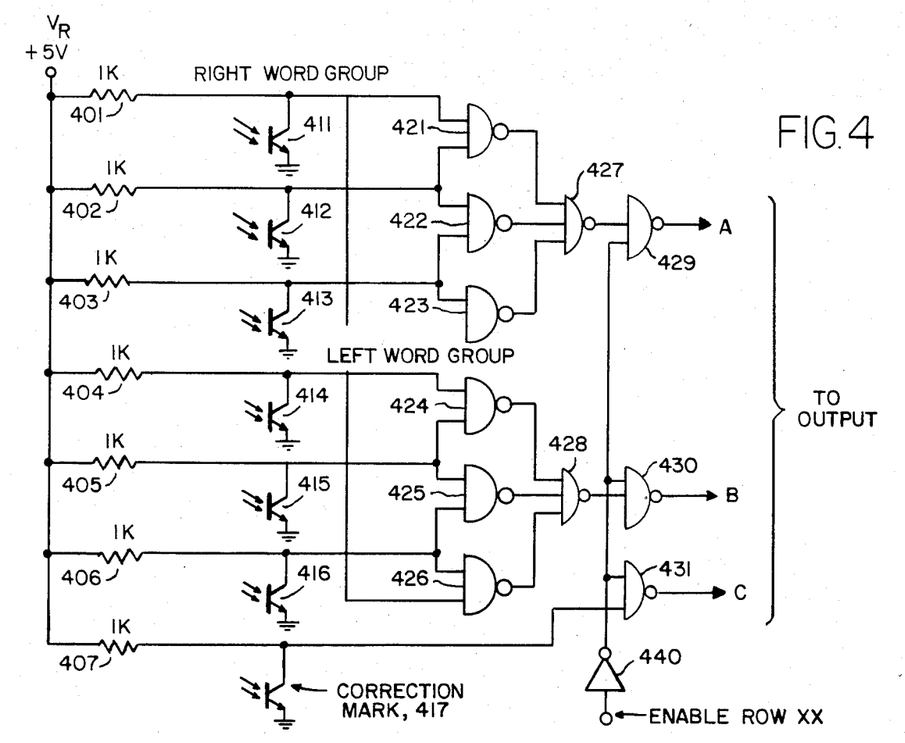
FIG. 4 is an illustration of the Work Mark Logic Circuit.

FIG. 4 is an illustration of the Word Mark Logic Circuit comprising resistors 401–407, transistors 411–417, NAND gates 421–431 and inverter 440.

In this particular embodiment, there exists a Word Mark Logic Circuit assigned to each row of light sensitive transistors in the Sensing Matrix and a total of 58 rows. These 58 rows correspond to the 58 rows of word pairs of the Diagnostic Rhyme Test. Therefore, in the embodiment described below, there exists 58 Word Mark Logic Circuits.

The Word Mark Logic Circuit, when enabled, will produce a logic 1 output for an identifiable column when no mark is present, and a logic 0 in an identifiable column when a mark is present. As shown in FIG. 4, a voltage potential $V_R$ is applied uniformly across the inputs of all word Mark Logic Circuits.

As mentioned above, the embodiment is planned for a row having two columns: A and B. Three input resistors and light-sensitive transistors are assigned to each column: 401,402,403 are 1K ohm resistors assigned to column A. 411,412,413 are the light sensitive transducers assigned to column A. 404,405,406 are 1K ohm resistors assigned to column B 414,415,416 are the light sensitive transistors assigned to column B.

Each light sensitive transistor is connected by its collector electrode to the Word Mark Logic input circuit behind its associated resistor, and to a common ground by its emitter electrode. The light sensitive transistors are arranged in a matrix, with the geometry determined by the format of the answer sheet, such that three transistors are associated with the location of each column element by having the base electrode of each transistor facing towards the corresponding planned location of where that column element of the answer sheet will sit when the sheet is being read.

The light sensitive transistors conduct current when their base electrodes are exposed to light (creating a short circuit between the input voltage potential and ground). The light sensitive transistors do not conduct when the base electrodes are not exposed to light (acting like an open circuit). Therefore, the input $V_R$, and each resistor and transistor produce a logic 1 input to the Word Mark Logic Circuit when not exposed to light, and a logic 0 input when exposed to light.

The Word Mark Logic Circuit uses a "voting system" to determine the presence or absence of a mark on a sheet of paper. FIG. 4 illustrates that, in this embodiment, a set of three light sensitive transistors are assigned to each column element in a row. Following the set of transistors for column A are three Nand gates: 421, 422, 423, each having an input of two of the three transistors. Following these Nand gates is one additional Nand gate which is identified as 427 for column A and 428 for column B. Collectively, the above elements function as a voting medium: if at least two of the three transistors indicate the presence (or absence) of a mark then the voting mechanism will report a logic 0 output when no mark is present, and a logic 1 output when a mark is present.

The voting system will also increase the reliability and availability of the OMR over the prior art devices. If a sensing element burns out in a prior art device, the device will be unable to give a response for the associated column element. Ihe OMR can continue to successfully operate and accurately vote the correct response when one of the light sensitive transistors ceases to function.

Next, the Word Mark Logic Circuit functions as directed by the logic control circuits of the OMR. The logic control circuits of the OMR "enable" a selected Word Mark Logic circuit by sending an enabling pulse through the inverter circuit labeled/440 of which in FIG. 1, enables both columns A and B of the Word Mark Logic Circuit. The enabling pulse for 440 goes into a set of Nand gates 429–431 with one Nand gate for each column in a row, along with the input from the voting circuit for that particular column. Therefore, Column A sends the results of its voting mechanism in Nand gate 429, and column B sends the results of its voting mechanism to Nand gate 430, along with the inverse enabling signal. The result is: the Word Mark Logic Circuit, when enabled, produces a logic 1 in eaoh column having no mark, and a logic 0 when there exists a mark. Without an enable, the outputs from this circuit will always be logic 1.

Finally, the Word Mark Logic Circuit has a correction mark circuit whose function is to indicate what answers are correct. FIG. 4 illustrates that the correction mark circuit contains an input resistor 407 with the voltage potential $V_R$ applied to it, and a light sensitive transistor 417 which functions in the manner described above for the column sensing elements.

The correction mark is used to reverse the column marked. This must be accomplished in the internal OMR logic circuits. When enabled by 440 the correction mark output will indicate a logic 0 for a mark and a logic 1 for no mark as read thru the output of NAND gate 431. Without an enable (logic 0) all the outputs from this circuit will be logic 1.

Figure 5:
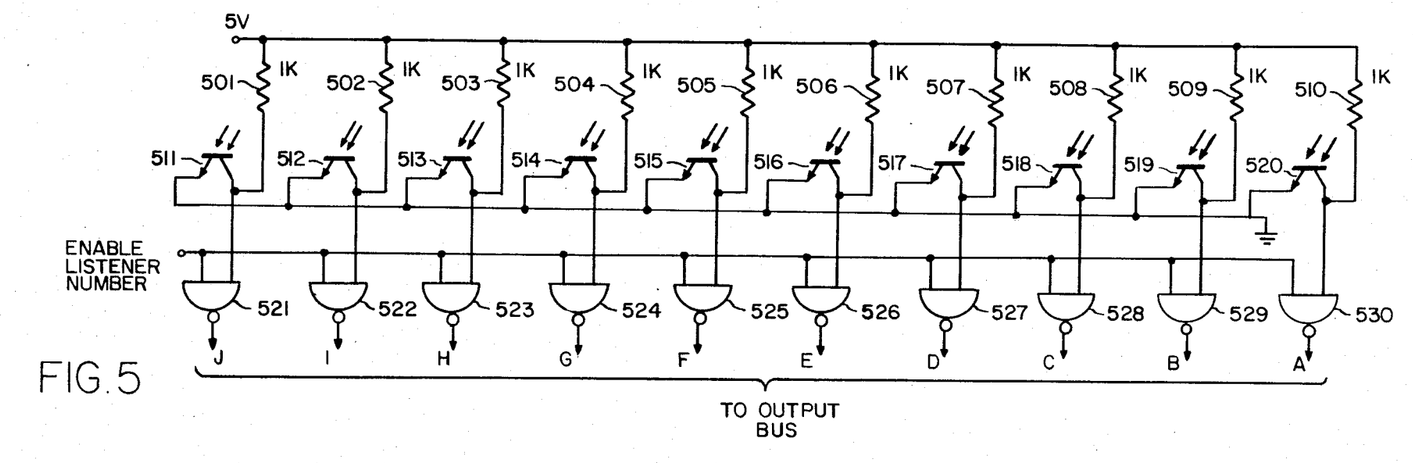
FIG. 5 is an illustration of the Listener Number Logic Circuit.

FIG. 5 is an illustration of the Listener Number Logic Circuit comprising: ten input resistors 501–510, ten light sensitive transistors 511–520, and ten NAND gates 521–530. There are four Listen Number Logic Circuits in this embodiment, each reading one of the four Listener rows shown in the Rhyme test format. Unlike the Word Mark Logic Circuit which only needs a choice made in one of two columns, the Listener Number Logic Circuit has ten columns in each row. Therefore, in the embodiment, there are ten sets of light sensitive transistors 511–520.

As shown in FIG. 3, a voltage potential $V_R$ equal to five volts is applied uniformly across the input of each Listener Number Logic Circuit. As mentioned above, the embodiment is planned for a row having 10 columns. One input resistor and light sensitive transistor are assigned to each column. Input resistors 501 through 510 are 1 K ohm resistors which are connected to the input $V_R$ on one terminal, and to the collector electrode of a light sensitive transistor on its other terminal.

The light sensitive transistors 511–520 are arranged in the matrix with their geometry determined by the format of the answer sheet such that the transistors are fixed with the base electrodes of each transistor facing towards the corresponding planned location of where that column element of the answer sheet will sit when the sheet is being read.

The lightsensitive transistors 511–520 conduct current when their base electrodes are exposed to light (creating a short circuit between the input voltage potential and ground). The transistors do not conduct if their base electrodes are not exposed to light (acting like an open circuit). Therefore, the input $V_R$, and each resistor and transistor produce a logic 1 input to the Listener Number Logic Circuit when not exposed to light, and a logic 0 input when exposed to light.

The OMR Logic Control Circuits "enable" a selected Listener Number Logic Circuit by sending a logic 1 enabling pulse. The enabling pulse goes into one input of a set of ten NAND gates 521–530, with one NAND gate for each column in a row. The other input of each NAND gate, is the output of its corresponding resistor and light sensitive transistor. The result is: a Listener Number Logic Circuit output of logic 0 when enabled and a mark covers the column, and a logic 1 when no mark covers the column.

Figure 6:
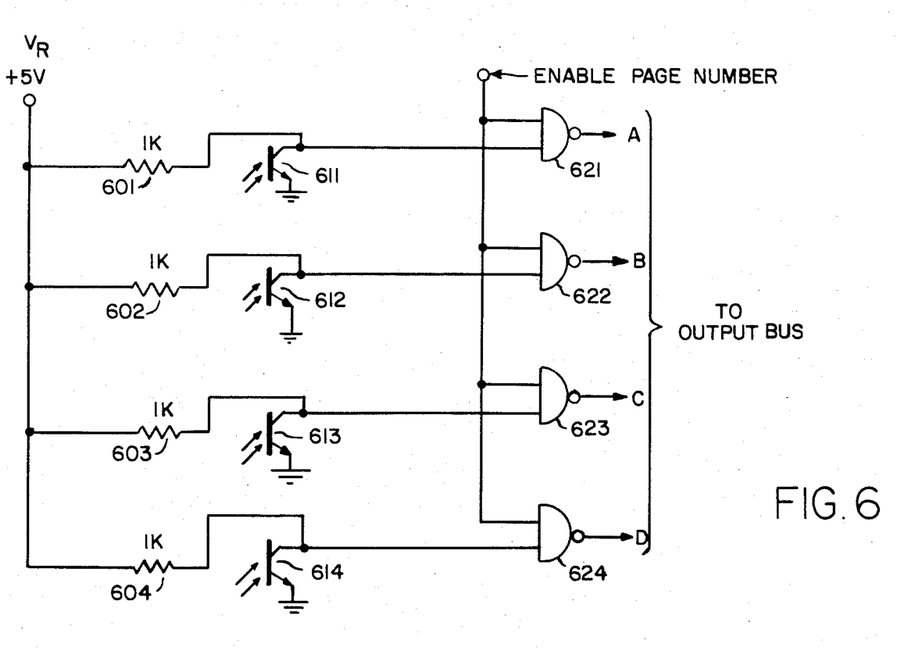
FIG. 6 is an illustration of the Page Number Logic Circuit.

FIG. 6 is an illustration of the Page Number Logic Circuit comprising four resistors 601–604, four light sensitive transistors 611–614, and four NAND gates 621–624.

As mentioned above, the DRT answer sheet has a pre-printed darkened, space to its upper right hand corner that functions as a page number. If successive pages are used, the space appears a measured distance to the right. Currently, a maximum of four pages is planned to be used.

Therefore, the Page Number Logic Circuit has a set of four light-sensitive transistors 611 through 614 associated with the four page number locations, and four input resistors 601 through 604. In the same manner as the other sensing circuits, the input circuit of the Page Number Logic circuit will produce a logic 1 for the sensor transistor covered by a mark, and a logic 0 when not covered by a mark.

Each Page Number Logic input circuit (601 and 611 through 604 and 614) feeds into one input of its associated NAND gate 621 through 624 along with an enable pulse (which is logic 1 for enable).

The Page Number Logic Circuit Output is a logic 0 (for each individual page number circuit) when enabled and covered by a mark, and a logic 1 otherwise.

Figure 7:
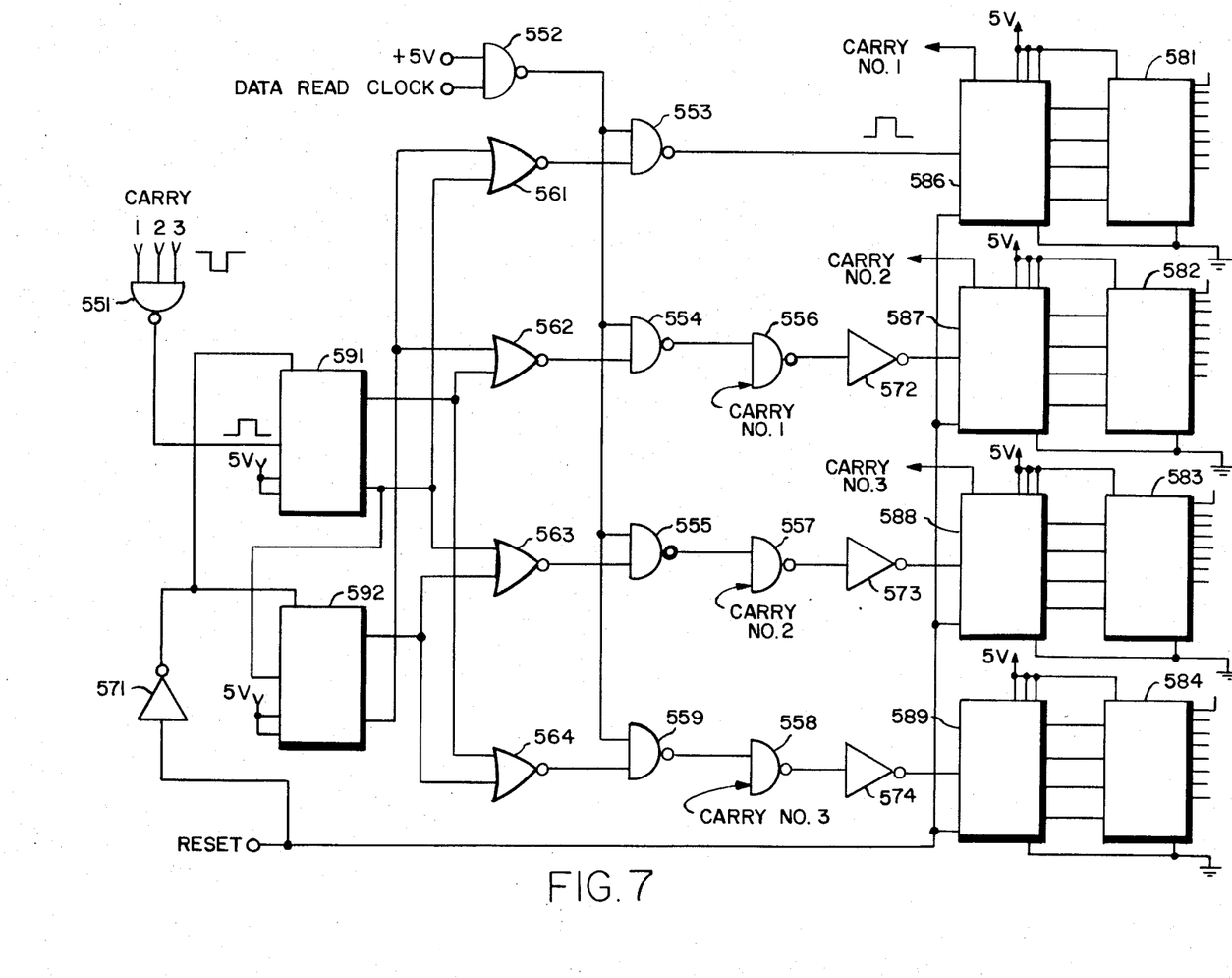
FIG. 7 is an illustration of the Control Address Logic Circuit.

FIG. 7 is an illustration of the Control Address Logic Circuit comprising nine NAND gates 551–559, four NOR gates 561–564, four inverter circuits 571–574, two input integrated circuits 591–592, four counter circuits 586–589 and four decoder circuits 581–584. The Control Address Logic Circuit causes the correct Word Mark Logic Circuit to be enabled.

As shown in FIG. 7, the Control Address Logic Circuit receives a "reset" signal, which enters directly into each Counter 586–589, and into an inverter circuit 571 and has distributor integrated circuits 591 and 592.

The Control Address Logic Circuit receives the data read clock signal from the OMR Master Logic Control Circuit as one input into a NAND gate 552. The other input into 552 is a voltage potential of 5 volts.

Also entering the Control Address Logic Circuit are three "carry" pulses which are generated by each counter 586, 587, and 588 in turn, when each has directed the enable of all its assigned Word Mark Logic Circuits, yet additional rows must be enabled. Carry #1 is generated by the first counter 586, carry #2 is generated by the Second Counter 587 and carry number 3 is generated by the 3rd counter 588. These three "carry" pulses enter the Contrtol Address Logic Circuit through NAND gate 551 which sends it output to the first distribution integrated circuit 591.

The distribution circuits 591 and 592 each provide an input into four NOR gates 561 through 564 which are associated with each of the four respective counters 586–589.

The Control Address Logic Circuit sends an enabling signal to each counter 586–589 by having 4 NAND gates 553, 554, 555 and 559 said the counter enabling signal to the 4 counters such that: the input into each NAND gate 553, 554, 555 and 559 is the signal from 552 in one input, and the signal from each associated NOR GATE 561 through 564 in the other input.

It is planned that all four counters be enabled sequentially, with a subsequent counter being enabled only after the previous counter has enabled all its associated Word Mark Logic Circuits. Therefore, the last three counters require something additional to enable them:

Counter number two 587 is enabled with the output of NAND gate 554 entering NAND gate 556 as one input, and the "carry" signal (carry #1 from 586) entering 556 as the other input. The signal from 556 then enters inverter 571 and enables the counter 587.

Similarly, counter member three 588 is enabled with the output of NAND gate 555 entering NAND gate 557 as one input, and the "carry" signal (carry #2 from 582) entering 557 as the other input. The signal from 557 then enters inverter 573 and enables the counter 588.

Finally, counter number four 589 is enabled with the output of NAND gate 559 entering NAND gate 558 as one input, and the "carry" signal (carry #3 from 588) entering 558 are the other input. The signal from 558 then enters inverter 574 and enables the counter 589. The four counter citcuits 586–589 count the number of pulses sent them by the counter enabling means and send a sum to the four associated decoder circuits 581 through 584. The decoder circuit decodes the output of the counter means and sends an enable pulse of logic 1 to a Word Mark Logic Circuit, to enable one row for each count.

Each counter 586 through 589 generates a "carry" signal as described above when it has counted all the way up and has directed an enable for all the rows associated with it. When the last counter 589 has counted high enough for all its rows to have been enabled, the next clock pulse causes the hold to go to logic 0 (which disables the system clock) and causes the ready indicator lamp to light on the front panel of the OMR.

The ready lamp notifies the OMR operator that the OMR has read the sheet. The host computer will know when the OMR has completed the reading of the sheet by counting the outputs it has received.

Figure 8:
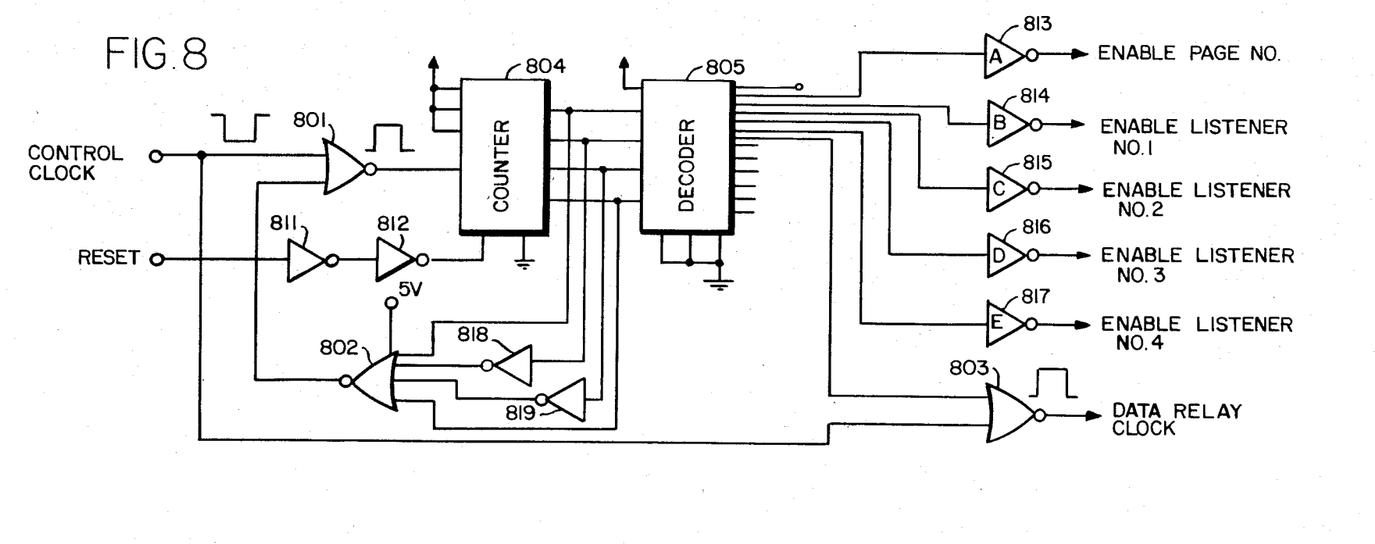
FIG. 8 is an illustration of the Master Logic Control Circuit.

FIG. 8 is an illustration of the Master Logic Control Circuit (MLCC) comprising of: three NOR gate 801–803, a counter 804, a decoder circuit 805, and nine inverter circuits 811–819.

The master Logic Control Circuit controls which section of the page is to "be read", enables both the Page Number Logic Circuit and the four Listen Number Logic Circuits; and sends the data read clock signal to the Control Address Logic Circuit.

The Master Logic Control Circuit accomplishes the above by use of: the Counter Circuit 804 which sends out a signal to enable the Page Number Logic Circuit when receiving a count of 0001 (binary) from a Counter Enabling Means, plus a signal to enable separate Listener Number Logic Circuits for each count it received above 0001 (binary);

the Decoder Circuit 805 which receives the count signals from the Counter Circuit and distributes that signal to the separate elements of the MLCC Output Interface; an MLCC Output Interface containing inverter circuits 813-817 and a NOR gate 803, the first inverter circuit 813 sends out the enable pulse to the Page Number Logic Circuit, the 4 subsequent inverter circuits, 814 through 817, send out the enable pulse to the 4 Listen Number Logic Circuits, and the NOR gate 803 receives the control clock signal from the system control clock into one of its inputs, and the output of the Decoder Circuit 805 into its other input, and transmits the resultant data read clock signal to the Control Address Logic Circuit; and, a Counter Enabling Circuit (801, 802, 811, 812, 818 and 819). The Counter Enabling circuit contains two inverter circuits, 811 a 812, which receives the reset pulse from the operator manual control button, and input that signal to start the Counter 804. The Counter Enabling Circuit also receives the "delay completed" pulse from the System Delay and Ouptut Logic Circuit as one input into a NOR gate 801 which goes into the counter circuit 804. The other input into the NOR gate 801 is the output signal from NOR gate 802, which has 4 input signals. The 4 input signals of NOR gate 802 are the 4 outputs of the Counter Circuit, two of which are each processed by the inverters 818 and 819.

Figure 9:
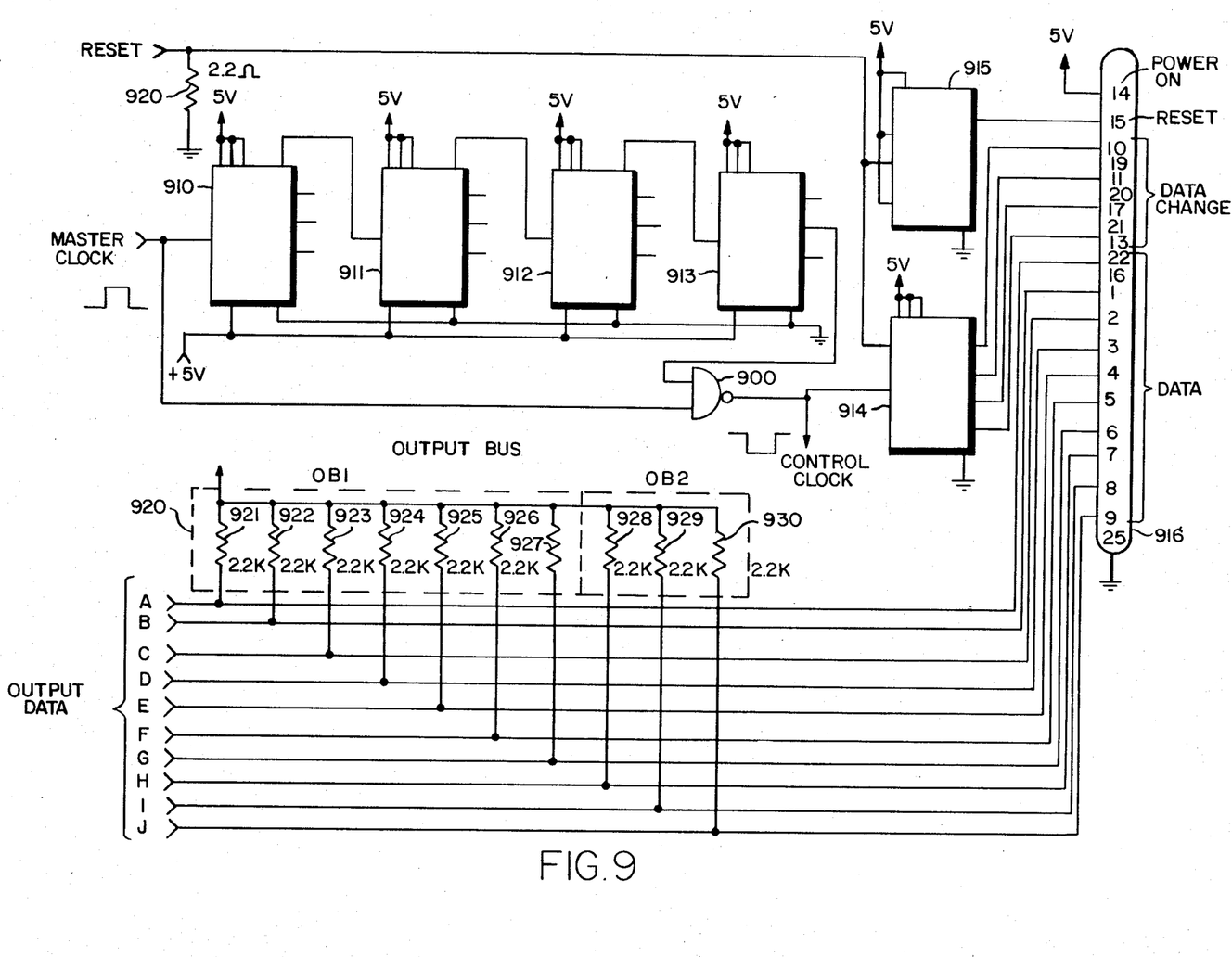
FIG. 9 is an illustration of the Delay and Ouptut Logic Circuit.

FIG. 9 is an illustration of the Delay and Output Logic Circuit, which comprises eleven resistors 920-930, an input interface circuit 915, a clocking circuit made up of four integrated circuits 910-913, a NAND gate 900, an integrated circuit 914, an output interface circuit 916 and an output bus 920.

The Delay and Output Logic Circuit receives the operator manual command signal from the reset button on the front of the OMR, sends out a command signal to activate the OMR Logic circuits, produces a specified delay time for data to be gathered, and sends out a signal to terminate the OMR logic circuits at the expiration of the delay time which resets the OMR operator manual control device for subsequent readings.

The Delay and Output Logic has an input interface 915 which receives the operator manual command signal from the OMR reset button, is powered by a 5 volt Signal, and sends the "reset initiated" signal to the OMR output interface.

The Delay and Output Logic Circuit has a clocking circuit consisting of four identical integrated circuits 910 through 913, each commonly coupled. The clock circuit works with the Delay and Output Logic Circuit to generate a delay by generating 8192 clock pulses at a 10 KH$_z$ rate. Circuit 910 receives an activation signal when the OMR reset button is pushed, and a synchronization signal from the system master clock. Circuit 910 initiates its portion of the delay by generating its portion of the 8,182 clock pulse at the 10 KH$_z$ rate before sending out its activate signal out to the next portion of the clocking circuit 911.

Circuit 911 generates its portion of the delay by the same counting process before sending out its activate signal to 912. Circuit 912 generates its portion of the delay before sending its activate signal to 913.

Circuit 913 generates its portion of the delay before sending the "delay complete" signal out to NAND gate 900. The second input to 900 is the master clock signal.

Circuit 900 is a NAND gate which combines the delay complete signal it receives with the master clock signal and sends out the complete delay signal in the form of logic 0 to a counting circuit 914, which passes the "delay complete" signal to the OMR output interface circuit 916 via intergrated circuit 914.

Circuit 914 receives the activate signal from the operator control interface, and produces a "delay in process" signal, which is sent to the OMR ouptut Interface Circuit.

The OMR output Interface Circuit 916 is an integrated circuit which delivers data to the host computer; receives the "data changing" signal from the Counting Circuit 914, receives a 5 volt power on signal from the OMR output condenser, and receives the "reset initiated signal generated" by the delay circuits 910 through 913 through 914.

Therefore, the OMR software support requirements include a host computer which can interface with the OMR output bus which provides the following data:

| Output pin # | Data |
| --- | --- |
| 16 | #0. (listener # or page #) or right column |
| 1 | #1. or left column |
| 2 | #2. or correction column |
| 3 | #3 |
| 4 | #4 |
| 5 | #5 |
| 6 | #6 |
| 7 | #7 |
| 8 | #8 |
| 9 | #9 |
| 10 | bit #1, data changing |
| 11 | bit #2, data changing |
| 12 | bit #3, data changing |
| 13 | bit #4, data changing |
| 14 | +5v (power on) |
| 15 | reset occur |
| 25 | ground |

Once a reset has occurred, pin 15 of the output terminal is toggled (changed state), and the OMR begins to count down a delay of approximately 0.82 seconds. After this delay, the OMR begins to count down a delay of approximately 0.82 seconds. Afer this delay, the OMR will begin to put data out to the output terminals; the data changing pins (10-13) will provide a binary upcount each time a new data word is ready to be read. The data itself will follow the following pattern: page number, listener number—1st digit, listener number—2nd digit, listener number—3rd digit, listener number—4th digit, left column word pairs (top-to-bottom in turn), and right column word pairs (top-to-bottom in turn). New data will be ready at approximately over 100 u seconds, in NRZ format. A mark is indicated by a logical 0 on the appropriate pin. After word pair 58 is output all date lines will be at logical 1 (5 volts). Once the power on sequence has been completed, and the computer program is running, the OMR is ready to read a marked sheet and the ready lamp will be lit. The sheet to be read is placed, printed side up (top of the form towards the operator), into the OMR slot and depress the reset button. When the ready lamp is lit again (approximately 1 second later) the OMR is ready for the next sheet. The previous sheet is removed and process is repeated until all sheets have been read.

Clearly, many modifications and variations of the present invention are possible in light of the above teachings and it is therefore understood, that within the inventive scope of the inventive concept, the invention may be practiced otherwise than specifically claimed.

What is claimed is:

1. An apparatus for use with a host computer for detecting and locating discrete opaque regions a distal surface of a translucent sheet member, said apparatus comprising:
    an illumination source illuminating said surface with electromagnetic wave energy;
    a sensing means, said sensing means containing sets of an odd number of light sensitive transistor circuits, each of said sets being fixed in a proximate relationship to the distal surface of said sheet member, each set thereof being in register with a discrete region of said sheet member and having an output responsive to translucent and opaque conditions thereof;
    voting circuits, each of which are electrically connected to one of said sets of said light sensitive transistor circuits in said sensing means, each of said voting circuits generating a vote signal of logic 1 when a majority of said light sensitive transistors in the set are covered by a mark and a logic 0 when a majority of said light sensitive transistor are not covered by a mark; and
    a word output logic circuit which receives said vote signals from said voting circuits and reports said vote signals to said host computer.

2. An apparatus for detecting and locating discrete opaque regions on one surface of a translucent sheet member as defined in claim 1 wherein said voting circuits comprise:
    a plurality of open collector NAND gates, each electrically connected with one of said sets of an odd number of light sensitive transistor circuits and receiving the output signal from a selected row light sensitive transistor circuits in said sensing means, said light sensitive transistor circuits being in location corresponding to a position where a mark will be made on selected columns in a particular row on said sheet of paper, said open collector NAND gates each providing a logic 1 when a mark covers said selected light sensitive transistor circuit, and a logic 0 when no mark covers said selected light sensitive transistor circuit, said plurality of open collector NAND gates thereby acting as a counter to report an absence of a mark when all of said light sensitive transistor circuits indicate its absence and reporting the presence of a mark on said translucent sheet member otherwise.

3. An apparatus for detecting and locating discrete opaque regions on one surface of a translucent sheet member as defined in claim 2 wherein each of said sets of odd number of light sensitive transistor circuits comprises:
    three light sensitive transistors which are fixed in proximity with each other and provide an electrical output signal in response to said illumination source when not covered by a mark on said translucent sheet member, said three light sensitive transistors not producing an electrical output signal when covered by a mark on said translucent sheet member.

4. An apparatus for detecting and locating discrete opaque regions on one surface of a translucent sheet member as defined in claim 1 wherein said voting circuit comprises a plurality of binary counters, each electrically connected with one of said sets of an odd number of light sensitive transistor circuits to receive and count output signals produced by them, each of said binary counters reporting a logic 1 when a majority of said sets of light sensitive transistors are covered by a mark and said binary counters producing no output signal and reporting a logic 0 otherwise.

* * * * *